Patented Oct. 31, 1944

2,361,476

UNITED STATES PATENT OFFICE 2,361,476

PRODUCTION OF OIL SOLUTIONS OF ALKALINE EARTH METAL SULPHONATES

Harold B. Higbee, Llanerch, and William K. Griesinger, Drexel Hill, Pa., assignors to The Atlantic Refining Company, Philadelphia, Pa., a corporation of Pennsylvania No Drawing. Application March 18, 1943, Serial No. 479,672

10 Claims. (Cl. 252—33)

The present invention relates to the production of hydrocarbon oil solutions of alkaline earth metal sulphonates, and more particularly to the preparation of lubricating oil additives comprising a viscous hydrocarbon oil solution of calcium sulphonate.

It has been proposed heretofore to incorporate by various methods "detergents" such as calcium petroleum sulphonates in lubricating oil designed for use in internal combustion engines. In one procedure, oil-soluble sodium sulphonates derived as a byproduct in the manufacture of mineral white oil were transposed to calcium sulphonates by treatment with reactive calcium compounds, and the resulting calcium sulphonate was then admixed with the lubricating oil. In another procedure, oil-soluble sulphonic acids were isolated from sulphuric acid treated hydrocarbon oil, and the free sulphonic acids in substantially pure condition were added to lubricating oil and thereafter neutralized with a basic calcium compound to produce calcium sulphonate in the oil. In a third procedure, the hydrocarbon stock was subjected to sulphonation, and after removal of sludge, the resulting hydrocarbon solution of sulphonic acids was neutralized with an aqueous slurry or suspension of hydrated lime. All of these methods have been open to objection as involving either unnecessary and uneconomical steps such as isolation of the free sulphonic acids or their sodium salts and their subsequent transposition to calcium sulphonates, or as in the case of the third procedure mentioned, the difficulties encountered in the formation of emulsions or gels which rendered the method impractical in commercial operations.

We have found that these difficulties may be obviated and that alkaline earth metal sulphonates, particularly calcium petroleum sulphonate may be formed directly in the lubricating oil by neutralizing the sulphonic acids produced therein by a sulphonation treatment with substantially dry calcium hydroxide (high calcium hydrated lime), as is more fully set forth hereinafter.

In accordance with our invention, a suitable lubricating oil stock such as a naphthenic oil distillate or a solvent extract fraction obtained by the selective solvent treatment of hydrocarbon oil, is subjected to sulphonation by contacting with a sulphonating agent, e. g., sulphuric acid of high concentration at a temperature sufficiently elevated as to produce maximum sulphonation without excessive loss to acid sludge. Temperatures between 150° F. and 175° F., and preferably between 160° F. and 170° F., using 98 per cent sulphuric acid have been found particularly suitable. The resulting acid sludge is separated from the oil, and to the oil containing oil-soluble sulphonic acids is added powdered hydrated lime in an amount in excess of that required to neutralize the oil, i. e., 3 per cent to 10 per cent excess. The powdered lime is thoroughly dispersed in the oil with vigorous agitation, and the mixture is then heated by steaming with open steam to a temperature of 170° F. to 190° F. The steaming is discontinued, and a small amount of water, i. e., about 3 per cent to 10 per cent is added to the heated mixture. The mixture is then agitated, preferably by air blowing, for a period of 1 to 2 hours, the temperature of the mixture decreasing to about 140° F. to 150° F. In this manner neutralization of the oil is obtained without the formation of emulsions or gels which are normally encountered when neutralizing with lime slurry as proposed in the prior art. The mixture, upon completion of the neutralization, is heated preferably by the application of heat from an external source, to a temperature of about 180° F. and is blown with air to remove residual moisture. To the oil containing oil-soluble calcium sulphonate, calcium sulphate, and excess lime is added a small amount of a filter aid, for example, 0.5 per cent of "Hyflow-Super-Cel," and the mixture is heated to a temperature between 200° F. and 250° F. and filtered at such temperature to remove the insoluble calcium compounds. In lieu of using a filter aid to assist in the removal of insoluble matter, the oil containing such matter may be diluted with a solvent such as naphtha, and then centrifuged, the naphtha being removed from the solution by distillation following the centrifuging. In order to increase the content of calcium sulphonate in the oil, the solution after the filtration or centrifuging step may be subjected to distillation under reduced pressure to remove at least a portion of the oil content. The resulting oil, after such concentration procedure, may contain of the order of 20 per cent to 40 per cent by weight of calcium sulphonate. This concentrate may be employed as a base material for blending with lubricating oil of desired viscosity in order to incorporate in the oil the desired amount of calcium sulphonate to function as a "detergent." In the event that it is not desired to remove at least a portion of the oil from the calcium sulphonate oil solution, the distillation step may be eliminated, and the oil may be utilized directly as a lubricant, with or without the addition of other agents such as antioxidants, corrosion inhibitors, film strength agents, and the like.

Our invention may be further illustrated by the following example, which however is not to be construed as limiting the scope thereof.

80 barrels of an extract fraction resulting from a nitrobenzene solvent extraction of a lubricating oil stock was admixed with 20 barrels of paraffin distillate. The extract fraction had an A. P. I. gravity of 18.2° and a Saybolt Universal viscosity of 580 seconds at 100° F., while the paraffin distillate had an A. P. I. gravity of 27° and a viscosity of 112 seconds at 100° F. The resulting blend had an A. P. I. gravity of 19.6° and a viscosity of 390 seconds at 100° F. This blended oil was contacted with four successive dumps of 5 per cent each of 98 per cent concentration sulphuric acid at a temperature of about 160° F., the resulting acid sludge being settled and removed from the oil following each dump of acid. The treated oil containing oil-soluble sulphonic acids was then air blown to remove sulphur dioxide. To the sulphonated oil was added 271 pounds of powdered, high calcium hydrated lime, which amount was about 10 per cent in excess of that required to neutralize the oil. The mixture of oil and powdered lime was thoroughly agitated at a temperature of about 110° F. by air blowing for 30 minutes in order to effect a uniform dispersion of the lime in the oil. The mixture was then contacted with open steam and brought to a temperature of about 180° F., the air agitation being continued during the steaming which required from 20 to 30 minutes. The steaming was discontinued, and about 3 per cent–5 per cent by volume of water was added to the mixture, which was then agitated with air for about 1½ hours, during which period the temperature decreased to about 140° F.–150° F. During this operation the oil-soluble sulphonic acids were substantially completely neutralized without the formation of a troublesome emulsion or gel. Upon completion of the neutralization step, the mixture comprising oil, oil-soluble calcium sulphonate, calcium sulphate, excess lime, and water was heated to about 180° F. by the application of heat from an external source, and the mixture was air blown to remove residual water.

In order to clarify the oil and to remove insoluble calcium compounds, a small amount of filter aid, for example, 0.5 per cent by weight of "Hyflow-Super-Cel" was added to the neutralized oil with vigorous agitation. This mixture was heated to a temperature between 200° F. and 250° F. and filtered to remove the filter aid and the insoluble calcium compounds. The filtrate comprised an oil solution containing about 14 per cent of calcium sulphonate, and had an A. P. I. gravity of 21.4° and a viscosity of 783 seconds at 100° F.

In order to concentrate the calcium sulphonate, the solution was distilled under reduced pressure to remove at least a portion of the oil. To obtain about 30 per cent by weight of calcium sulphonate, the solution was distilled to a 45 per cent bottoms or residue having an A. P. I. gravity of 16.4°. The oil distilled overhead amounting to 34.1 barrels may be suitably employed in the production of lubricants, or otherwise disposed of. In the event that it is desired to produce a concentrate containing a higher or lower percentage of calcium sulphonate, the distillation may be regulated to take overhead either more or less oil. The concentrate thus produced may be blended with lubricating oils to produce lubricants of desired viscosity containing varying amounts of calcium sulphonate. For example, the concentrate may be added to a refined lubricating oil to give a blend containing from 0.5 per cent to 10 per cent of calcium sulphonate. To such blend may also be added one or more agents for inhibiting oxidation or corrosion, or for imparting film strength or oiliness to the product.

While, herein, we have described the sulphonation treatment particularly in connection with the use of sulphuric acid of 98 per cent concentration, we may utilize other sulphonating agents including sulphuric acid of higher or lower concentration, i. e., 93 per cent or 100 per cent, or fuming sulphuric acid, or chlorsulphonic acid. The quantity of sulphonating agent used will depend upon the amount of sulphonation desired, as well as upon the temperature of sulphonation and the strength of the sulphonating agent. In general, the quantity of sulphonating agent utilized will vary from 15 per cent to 50 per cent by volume of the oil to be treated.

In the neutralization step, we prefer to employ substantially dry, powdered hydrated lime when it is desired to produce calcium sulphonate in oil solution. We have found that best results are obtained by dispersing this basic calcium compound in the oil in a substantially dry state, and thereafter steaming the mixture, with the addition of a small amount of water, to effect neutralization of the oil. It is necessary to thoroughly disperse the powdered lime in the oil prior to steaming or the addition of water, in order to prevent the formation of gels or emulsions which are very difficult to handle, and which when once formed, render the removal of insoluble calcium compounds from the oil virtually impossible. The use of powdered lime, without steaming or the addition of small amounts of water, has been found impractical since substantial neutralization could not be obtained.

When it is desired to form sulphonates of the alkaline earth metals other than calcium, we may employ the dry, powdered basic compounds of strontium, barium, and magnesium, utilizing the technique hereinbefore described.

We claim:

1. The method of producing a hydrocarbon oil solution of an alkaline earth metal sulphonate, which comprises sulphonating a viscous hydrocarbon oil, separating spent sulphonating agent and sludge from the sulphonated oil, adding dry alkaline earth metal hydroxide to the sulphonated oil, steaming the resulting mixture, and separating from the neutralized oil containing oil-soluble alkaline earth metal sulphonates, insoluble alkaline earth metal compounds.

2. The method of producing a hydrocarbon oil solution of an alkaline earth metal sulphonate, which comprises sulphonating a viscous hydrocarbon oil, separating spent sulphonating agent and sludge from the sulphonated oil, adding dry alkaline earth metal hydroxide to the sulphonated oil, steaming the resulting mixture, adding a small amount of water to said mixture, air blowing the mixture at elevated temperature, and separating from the neutralized oil containing oil-soluble alkaline earth metal sulphonates, insoluble alkaline earth metal compounds.

3. The method of producing a hydrocarbon oil solution of an alkaline earth metal sulphonate, which comprises sulphonating a viscous hydrocarbon oil, separating spent sulphonating agent and sludge from the sulphonated oil, adding dry alkaline earth metal hydroxide to the sulphonated oil, steaming the resulting mixture, adding a small amount of water to said mixture, air blowing the mixture at elevated temperature, separating from the neutralized oil containing oil soluble alkaline earth metal sulphonates, insoluble alkaline earth metal compounds, and distilling at least a portion of the oil from the oil solution of the sulphonates.

4. The method of producing a hydrocarbon oil solution of calcium sulphonate, which comprises sulphonating a viscous hydrocarbon oil, separating spent sulphonating agent and sludge from the sulphonated oil, adding dry calcium hydroxide to the sulphonated oil, steaming the resulting mixture, and separating from the neutralized oil containing oil-soluble calcium sulphonate, insoluble calcium compounds.

5. The method of producing a hydrocarbon oil solution of calcium sulphonate, which comprises sulphonating a viscous hydrocarbon oil, separating spent sulphonating agent and sludge from the sulphonated oil, adding dry calcium hydroxide to the sulphonated oil, steaming the resulting mixture, adding a small amount of water to said mixture, air blowing the mixture at elevated temperature, and separating from the neutralized oil containing oil-soluble calcium sulphonate, insoluble calcium compounds.

6. The method of producing a hydrocarbon oil solution of calcium sulphonate, which comprises sulphonating a viscous hydrocarbon oil, separating spent sulphonating agent and sludge from the sulphonated oil, adding dry calcium hydroxide to the sulphonated oil, steaming the resulting mixture, adding a small amount of water to said mixture, air blowing the mixture at elevated temperature, separating from the neutralized oil containing oil soluble calcium sulphonate, insoluble calcium compounds, and distilling at least a portion of the oil from the oil solution of the sulphonate.

7. The method of producing a hydrocarbon oil solution of calcium sulphonate, which comprises contacting a viscous hydrocarbon oil with sulphuric acid of high concentration at a temperature between 150° F. and 175° F. to effect sulphonation of components of the oil, separating spent sulphuric acid and sludge from the sulphonated oil, adding dry calcium hydroxide to the sulphonated oil in quantity slightly in excess of that required for neutralization of the sulphonated oil, steaming the resulting mixture at a temperature between 170° F. and 190° F., and separating from the neutralized oil containing oil-soluble calcium sulphonate, insoluble calcium compounds.

8. The method of producing a hydrocarbon oil solution of calcium sulphonate, which comprises contacting a viscous hydrocarbon oil with sulphuric acid of high concentration at a temperature between 150° F. and 175° F. to effect sulphonation of components of the oil, separating spent sulphuric acid and sludge from the sulphonated oil, adding dry calcium hydroxide to the sulphonated oil in quantity slightly in excess of that required for neutralization of the sulphonated oil, steaming the resulting mixture at a temperature between 170° F. and 190° F., adding a small amount of water to said mixture, air blowing the mixture at a temperature between 140° F. and 180° F., and separating from the neutralized oil containing oil-soluble calcium sulphonate, insoluble calcium compounds.

9. The method of producing a hydrocarbon oil solution of calcium sulphonate, which comprises contacting a viscous hydrocarbon oil with sulphuric acid of high concentration at a temperature between 150° F. and 175° F. to effect sulphonation of components of the oil, separating spent sulphuric acid and sludge from the sulphonated oil, adding dry calcium hydroxide to the sulphonated oil in quantity slightly in excess of that required for neutralization of the sulphonated oil, steaming the resulting mixture at a temperature between 170° F. and 190° F., adding a small amount of water to said mixture, air blowing the mixture at a temperature between 140° F. and 180° F., separating from the neutralized oil containing oil-soluble calcium sulphonate, insoluble calcium compounds, and distilling at least a portion of the oil from the oil solution of the sulphonates.

10. The method of producing a hydrocarbon oil solution of calcium sulphonate, which comprises contacting a viscous, naphthenic hydrocarbon oil with sulphuric acid of about 98 per cent concentration at a temperature between 160° F. and 170° F. to effect sulphonation of components of the oil, separating spent sulphuric acid and sludge from the sulphonated oil, air blowing the sulphonated oil to remove sulphur dioxide, adding dry calcium hydroxide to the sulphonated oil in quantity about 10 per cent in excess of that required for neutralization of the sulphonated oil, air blowing the mixture to disperse the calcium hydroxide in the oil, agitating the mixture with air and steam at a temperature of about 180° F., adding about 10 per cent by volume of water to the mixture, air blowing the sulphonated oil-calcium hydroxide-water mixture at a temperature between 140° F. and 150° F. to effect neutralization of the sulphonated oil, further air blowing the mixture at about 180° F. to drive off the water, adding a small quantity of filter aid to the mixture with agitation, filtering the mixture at a temperature between 200° F. and 250° F. to remove the filter aid and insoluble calcium compounds, and distilling under reduced pressure at least a portion of the oil from the oil solution of calcium sulphonate.

HAROLD B. HIGBEE.
WILLIAM K. GRIESINGER.